(12) United States Patent
Naemura et al.

(10) Patent No.: US 8,096,754 B2
(45) Date of Patent: Jan. 17, 2012

(54) STRUCTURE OF EXHAUST TURBOCHARGER HAVING WASTE GATE VALVE

(75) Inventors: Kazuo Naemura, Kanagawa (JP); Yoshimitsu Miura, Kanagawa (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 702 days.

(21) Appl. No.: 12/223,332

(22) PCT Filed: Oct. 18, 2007

(86) PCT No.: PCT/JP2007/070759
§ 371 (c)(1),
(2), (4) Date: Sep. 11, 2008

(87) PCT Pub. No.: WO2008/047943
PCT Pub. Date: Apr. 24, 2008

(65) Prior Publication Data
US 2009/0028694 A1 Jan. 29, 2009

(30) Foreign Application Priority Data
Oct. 20, 2006 (JP) .................................. 2006-286464

(51) Int. Cl.
*F01B 25/10* (2006.01)
*F01B 25/02* (2006.01)
*F02D 23/00* (2006.01)
*F04D 29/08* (2006.01)

(52) U.S. Cl. .......................... 415/144; 60/600; 415/56.4

(58) Field of Classification Search .................. None
See application file for complete search history.

(56) References Cited

U.S. PATENT DOCUMENTS
4,530,640 A * 7/1985 MacInnes ..................... 415/144
(Continued)

FOREIGN PATENT DOCUMENTS
JP 58-4732 1/1983
(Continued)

OTHER PUBLICATIONS
International Search Report mailed Dec. 25, 2007 for International Application No. PCT/JP2007/070759.

*Primary Examiner* — Benjamin Sandvik
*Assistant Examiner* — Joseph Schoenholtz
(74) *Attorney, Agent, or Firm* — Wenderoth, Lind & Ponack, L.L.P.

(57) ABSTRACT

An exhaust turbocharger is enhanced in durability and reliability by making the valve body of the waste gate valve contact the seat face of the turbine housing at the opening of two exhaust gas bypass passages uniformly without being affected by the end face of the partition wall partitioning the two bypass passages, thereby preventing generation of vibration and vibration sound(chattering) of the valve body and the occurrence of gas leakage due to defective seating of the valve body against the seat face of the turbine housing. The waste gate valve for opening/closing the two exhaust gas bypass passages has a plate-like valve body to seat against and depart from a seat face at an outlet end side of the two bypass passages, wherein a depression is formed to a seat-side face of the valve body or to the end face of the partition wall so that the seat-side face of the valve body does not contact the end face of the partition wall at least in the central region of the end face of the partition wall when the valve body seats against the seat face at the outlet end side of the bypass passages.

5 Claims, 5 Drawing Sheets

U.S. PATENT DOCUMENTS

| | | | |
|---|---|---|---|
| 4,730,456 A * | 3/1988 | Tadokoro et al. | 60/602 |
| 5,046,317 A * | 9/1991 | Satokawa | 60/602 |
| 6,543,228 B2 * | 4/2003 | Deacon | 60/602 |
| 6,729,134 B2 * | 5/2004 | Arnold et al. | 60/602 |
| 6,748,848 B1 * | 6/2004 | Riley et al. | 92/103 R |
| 6,880,572 B2 * | 4/2005 | Hartley | 137/601.05 |
| 6,941,755 B2 * | 9/2005 | Bucknell et al. | 60/602 |
| 7,802,429 B2 * | 9/2010 | Yokoyama et al. | 60/605.3 |
| 2009/0028694 A1 * | 1/2009 | Naemura et al. | 415/145 |

FOREIGN PATENT DOCUMENTS

| | | | |
|---|---|---|---|
| JP | 58-004732 | * | 1/1983 |
| JP | 01-173425 | | 12/1989 |
| JP | 05-156958 | | 6/1993 |
| JP | 11-044219 | | 2/1999 |
| JP | 2005-226591 | | 8/2005 |

* cited by examiner

STRUCTURE OF EXHAUST TURBOCHARGER HAVING WASTE GATE VALVE

TECHNICAL FIELD

The present invention relates to the structure of an exhaust turbocharger having a twin scroll type turbine housing which has two exhaust gas entrance channels and being equipped with a waste gate valve.

BACKGROUND ART

Exhaust turbochargers for pressurizing charging air of engines by utilizing exhaust gas energy of the engines, especially those used in engines for automobiles that are equipped with waste gate valves, which allow a part of the exhaust gas from the engine to bypass the turbine of the exhaust turbocharger from the entrance passage to the outlet passage of the turbine housing via a bypass passage by opening the waste gate valve for opening/closing the bypass passage so that exhaust gas energy imparted to the turbine rotor is reduced in order to prevent excessive increase of charging air pressure exist.

Figure 4:
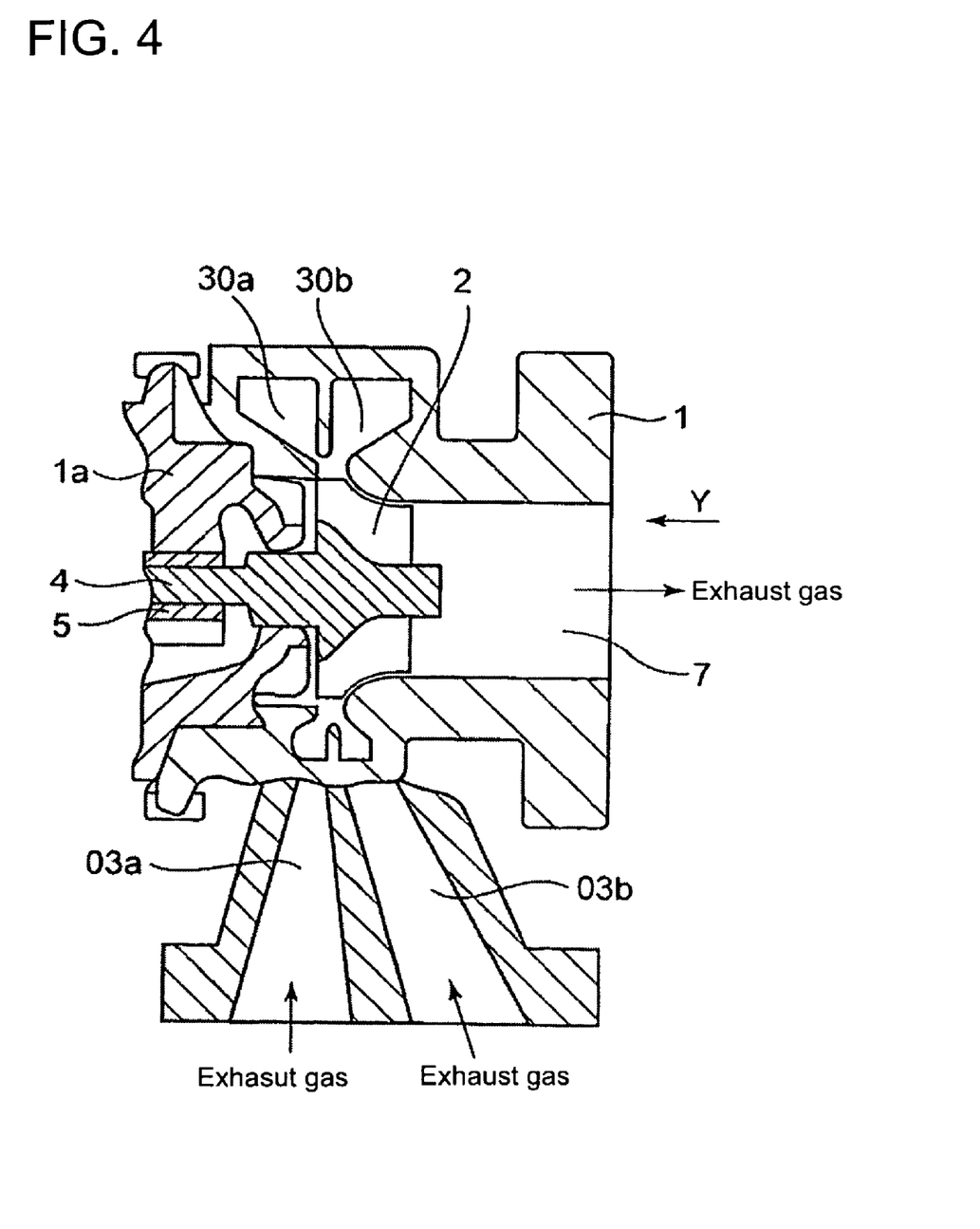
FIG. 4 is a longitudinal cross sectional view of the substantial part of turbine side of a turbocharger having a waste gate valve, to which the present invention is applied.
Figure 5:
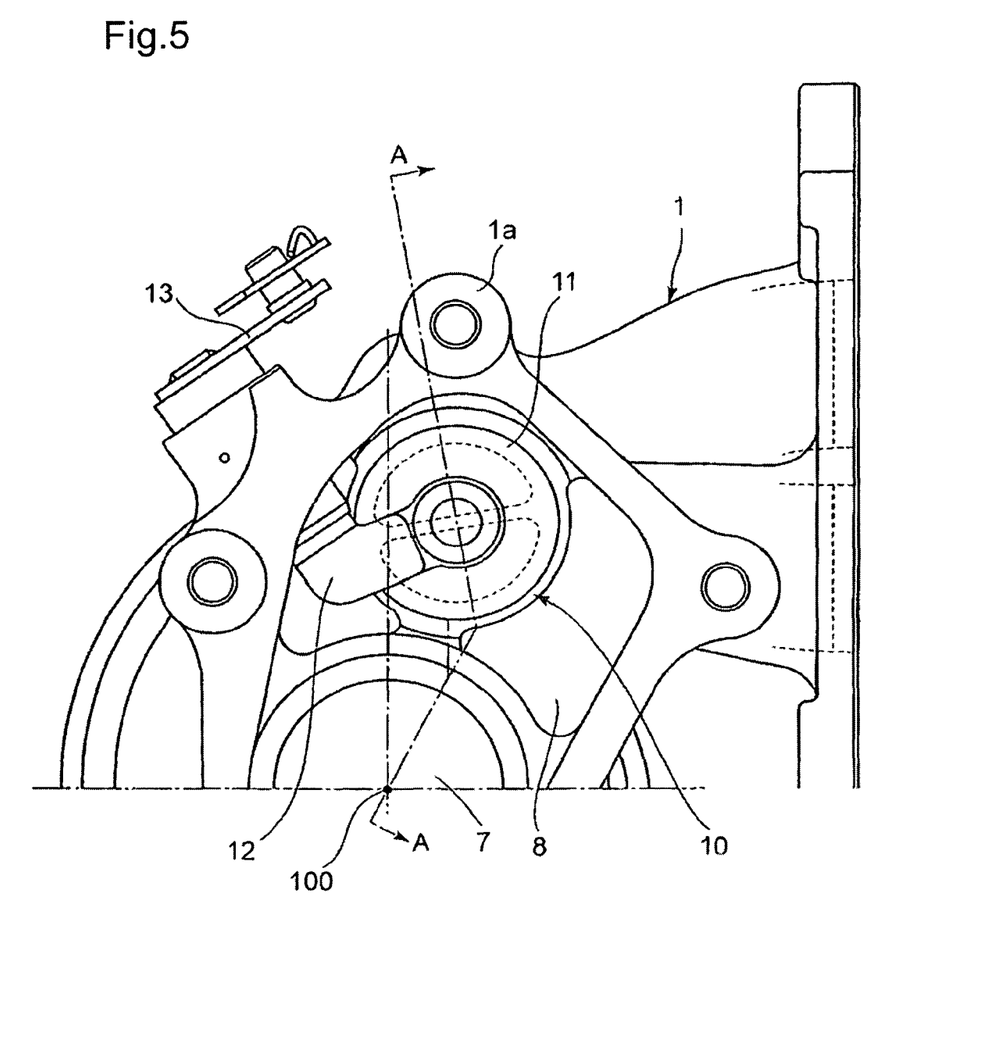
FIG. 5 is a view in the direction of the arrow Y in FIG. 4.
Figure 6:
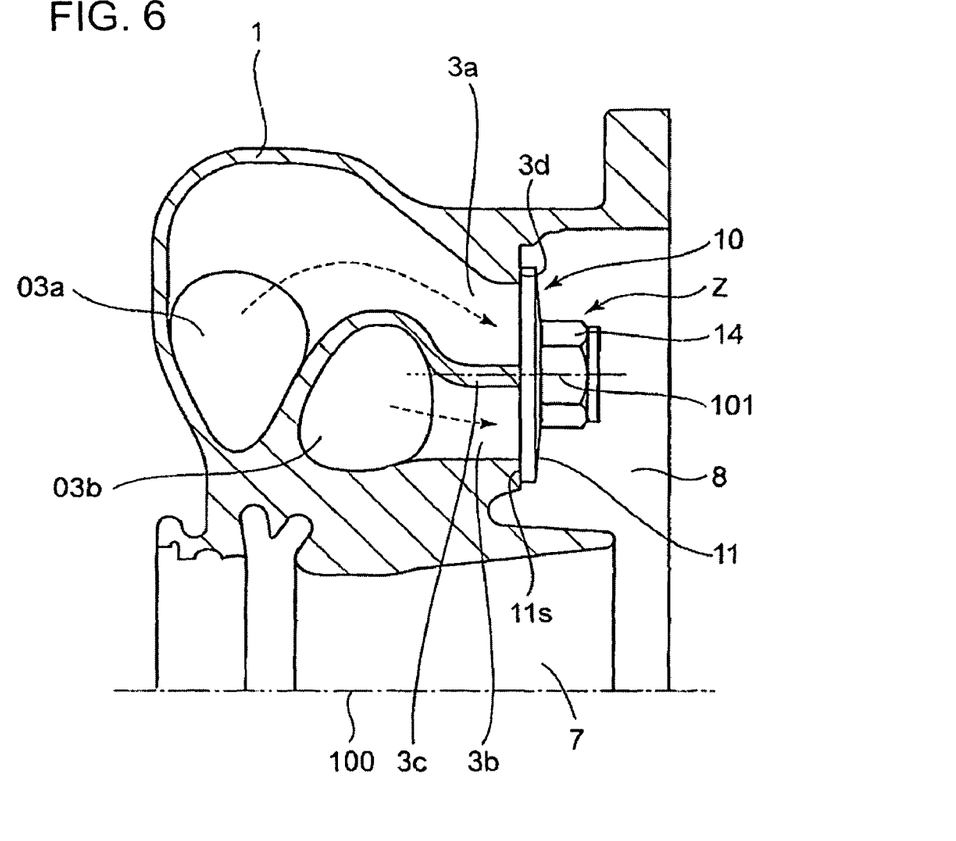
FIG. 6 is a cross sectional view along line A-A in FIG. 5.
Figure 7:
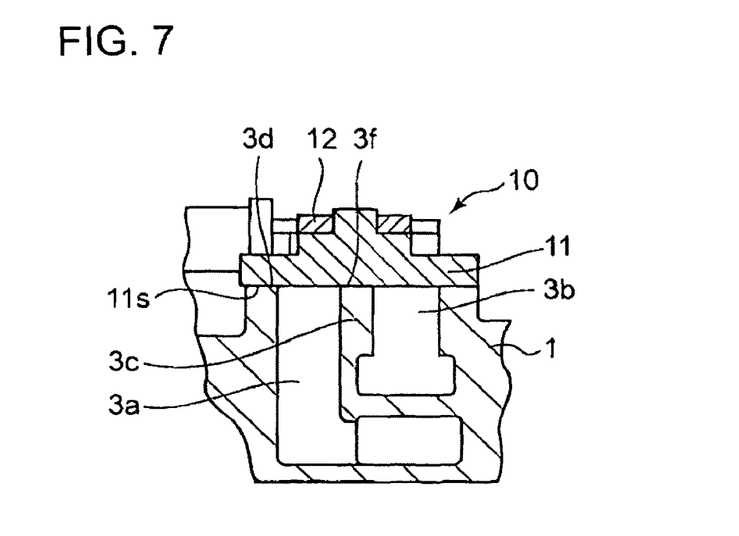
FIG. 7 is a partial cross sectional view of a conventional waste gate valve attached to the turbine housing.

FIGS. 4 to 7 show an example of a twin scroll type exhaust turbocharger having a waste gate valve disclosed for example in Japanese Laid-Open Patent Application No.11-44219 (patent literature 1), FIG.4 being a longitudinal cross sectional view of the substantial part of turbine side of the turbocharger, and FIG.7 being a partial cross sectional view of the waste gate valve attached to the turbine housing.

Referring to FIGS. 4 to 7, the turbocharger comprises a twin scroll type turbine housing 1 having two exhaust gas entrance channels, a bearing housing 1a fixed to the turbine housing 1, and a turbine rotor 2. A turbine shaft 4 of the turbine rotor 2 is supported for rotation by the bearing housing 1a via a bearing 5.

The turbine housing 1 has two exhaust gas entrance channels 03a and 03b connecting to two scroll passages 30a and 30b for guiding the exhaust gas to the entrance of the turbine rotor 2, exhaust gas bypass passages 3a and 3b, and an exhaust gas outlet passage 7. Reference numeral 8 is a space for opening the bypass passages to and it is a part of the exhaust gas outlet passage 7, so hereafter it is referred to also as the exhaust outlet passage 8. The exhaust gas bypass passages 3a and 3b are partitioned by a partition wall 3c of the turbine housing 1 and open into the exhaust gas outlet passage 8.

In FIG. 7, a waste gate valve 10 is provided at the ends of the exhaust gas bypass passages 3a and 3b opening into the exhaust gas outlet passage 8 to connect the exhaust gas entrance channels 03a and 03b to the exhaust gas outlet passage 8 bypassing the scroll passages 30a and 30b in order to open/close the bypass passages 3a, 3b.

The waste gate valve 10 includes a plate-like valve body 11 for opening/closing a pair of the exhaust gas bypass passages 3a and 3b, a lever 12 connected to the valve body 11, and other component parts. The waste gate valve 10 is composed such that the exhaust gas bypass passages 3a and 3b are closed or opened by allowing the valve body 11 to be seated against the seat face 3d of the turbine housing 1 at the opening end of the pair of the exhaust gas bypass passages 3a and 3b or to be departed from the seat face 3d by means of the lever 12 by actuating a waste gate valve drive device not shown in the drawings.

The waste gate valve experiences vibrations of the engine and exhaust gas pulsation.

In the twin scroll type exhaust turbocharger having a waste gate valve disclosed in patent literature 1, as shown in FIGS. 6 and 7, two exhaust gas bypass passages 3a and 3b are partitioned by a partition wall 3c, and the flat seat face 11s of the valve body 11 of the waste gate valve 10 is brought into close contact with the annular seat face 3d surrounding the pair of the exhaust gas bypass passages 3a, 3b and the end face 3f of the partition wall 3c, the end face 3f being finished level with the seat face 3d, when the waste gate valve 10 closes the exhaust gas bypass passages 3a, 3b.

When machining the seat face 3d to be level with the end face 3f, the end face 3f of the partition wall 3c of relatively small thickness partitioning the bypass passages 3a, 3b is machined together with the annular seat face 3d surrounding the pair of the bypass passages, so the end face 3f, particularly central part thereof of the partition wall 3c tends to be protruded from the seat face 3d. If the end face 3f is protruded from the seat face 3d, the flat seat face 11c of the valve body 11 contact the end face 3f of the partition wall 3c before it comes to contact with the annular seat face 3d when the valve body 11 closes the bypass passages and a clearance is formed between the seat face 11c of the valve body 11 and the annular seat face 3d of the turbine housing 1. As a result, the valve body 11 swings with the extending line of end face 3f of the partition wall as a fulcrum axis when the valve body 11 closes the bypass passages. That is, the valve body 11 can not completely close the bypass passages, and vibration of the valve body 11 occurs accompanying chattering noise. Further, exhaust gas leak through the clearance between the seat face 11c of the valve body 11 and the annular seat face 3d of the turbine housing occurs, resulting in decreased utilization of exhaust energy of the engine.

SUMMARY OF THE INVENTION

The present invention was made in light of the problems in prior art as mentioned above, and the object of the invention is to provide an exhaust turbocharger equipped with a waste gate valve which is enhanced in durability and reliability by making the valve body of the waste gate valve contact uniformly with the seat face of the turbine housing at the opening of two exhaust gas bypass passages without affected by the end face of the partition wall partitioning the two bypass passages, thereby preventing the generation of vibration and vibration sound(chattering) of the valve body of the waste gate valve and the occurrence of gas leakage due to defective seating of the valve body against the seat face of the turbine housing at the opening of two exhaust gas bypass passages.

To attain the object, the present invention proposes a structure of an exhaust turbocharger having a twin scroll type turbine housing which has two exhaust gas entrance channels and two exhaust gas bypass passages which connect the two exhaust gas entrance channels to an exhaust outlet passage of the turbine housing bypassing two scroll passages for guiding exhaust gas entered the turbine housing from the two entrance channels to a turbine rotor of the turbocharger and being equipped with a waste gate valve for opening/closing the two exhaust gas bypass passages by allowing a plate-like valve body of the waste gate valve to seat against and depart from a seat face formed at an outlet end side of the two bypass passages including an end face of the partition wall partitioning the two bypass passages, wherein a depression is formed to a seat-side face of the valve body or to the end face of the partition wall so that the seat-side face of the valve body does not contact the end face of the partition wall at least in the central region of the end face of the partition wall when the valve body seats against the seat face at the outlet end side of the bypass passages.

In the invention, it is preferable to composes concretively such that:

(1) The two bypass passages open into the exhaust gas outlet passage of the turbine housing in a state of semicircular openings adjacent to each other via a diametral partition wall partitioning the two bypass passages and a seat face is formed including an annular seat face surrounding the circular parts of the semi-circles and an end face of the diametral partition wall, the end face being level with the annular seat face, and a circular depression is formed to a seat-side face of the valve body or to the end face of the partition wall, here the circular depression formed on the end face of the partition wall being an elongate depression as formed with a milling cutter of diameter equal to or smaller than the diameter of a circle formed by the circumferences of the semi-circles, so that the seat-side face of the valve body does not contact the end face of the partition wall at least in the central region of the end face of the partition wall when the valve body seats against the seat face at the outlet end side of the bypass passages.

The depression formed on the seat-side face of the valve body of the waste gate valve is suitable to be a conical depression having its apex on the center of the valve body or circular depression of a constant depth, (2) A depression is formed on the end face of the partition wall at least in the central region of the end face of the partition wall partitioning the two bypass passages.

The depression on the end face of the partition wall may be formed by milling with an end mill of diameter equal to or smaller than the diameter of a circle formed by the circumferences of semi-circles forming the openings of the two bypass passages at the outlet thereof opening into the exhaust gas outlet passage with its center line coinciding with the center line of the waste gate valve.

According to the invention, the plate-like valve body of the waste gate valve is formed such that the seat-side face thereof has a conical depression or constant-depth depression so that the seat-side face of the valve body does not contact the end face of the partition wall partitioning the bypass passages, or the plate-like valve body is formed such that the seat-side face thereof is a flat surface and a depression is formed on the end face of the partition wall so that the seat-side face of the valve body does not contact the end face of the partition wall over the length or a central region of the end face of the partition wall when the waste gate valve closes the bypass passages by allowing the seat face of valve body to seat against the seat face of the of the turbine housing at the outlet end of the bypass passages. Therefore, the occurrence of swing of the valve body with the extending line of the end face (which tends to protrude from the annular seat face when machining the seat face of the turbine housing at the outlet end of the bypass passages including the annular seat face and the end face of the partition wall) of the partition wall as a fulcrum axis of swing can be prevented when the valve body of the waste gate valve closes the bypass passages. Accordingly, the valve body can always seat against the seat face of the turbine housing at the opening end of the bypass passages evenly and the occurrence of vibration of the valve body, vibration sound (chattering), and exhaust gas leakage due to defective seating of the valve body when the valve body closes the bypass passages as often occurs in the case of the prior art can be eliminated.

In the case the end face of the partition wall is depressed at least in the central region of the end face, the fear is eliminated that the end face, particularly the central part thereof, of the partition wall protrudes from the seat face of the turbine housing at the opening end of the bypass passages when machining the seat face including the end face of the partition wall partitioning the bypass passages, and the valve body can seat against the seat face of the turbine housing evenly even when the seat-side face of the valve body is formed to be a flat face.

In this way, an exhaust turbocharger equipped with a waste gate valve can be provided which is enhanced in durability and reliability.

DETAILED DESCRIPTION OF THE INVENTION

Preferred embodiments of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

FIG. 4 is a longitudinal cross sectional view of the substantial part of turbine side of a turbocharger having a waste gate valve, to which the present invention is applied, FIG. 5 is a view in the direction of the arrow Y in FIG. 4, and FIG. 6 is a cross sectional view along line A-A in FIG. 5.

Referring to FIGS. 4-6, the exhaust turbocharger having a waste gate valve comprises a turbine housing 1 having a twin scroll type exhaust gas passage, a bearing housing 1a fixed to the turbine housing 1, a turbine rotor 2. A turbine shaft 4 of the turbine rotor 2 is supported for rotation by the bearing housing 1a via a bearing 5.

The turbine housing 1 has two exhaust gas entrance channels 03a and 03b connecting to two scroll passages 30a and 30b for guiding the exhaust gas to the entrance of the turbine rotor 2, exhaust gas outlet passages 7 and 8, and exhaust gas bypass passages 3a and 3b branching from the exhaust gas entrance channels 03a, 03b respectively to be opened into the exhaust gas outlet passage 8. The exhaust gas bypass passages 3a and 3b are partitioned by a partition wall 3c of the turbine housing 1.

In FIG. 6, a waste gate valve 10 is provided at the end of the pair of the exhaust gas bypass passages 3a and 3b opening into the exhaust gas outlet passage 8 to connect the exhaust gas entrance channels 03a and 03b to the exhaust gas outlet passage 8 bypassing the scroll passages 30a and 30b (see FIG. 4) in order to open/close the pair of the exhaust gas bypass passages 3a, 3b.

The waste gate valve 10 includes a plate-like valve body 11 for opening/closing the pair of the exhaust gas bypass passages 3a and 3b, a lever 12 connected to the valve body 11, a nut 14 for fastening the valve body 11 to the lever 12, a connecting arm 13. The waste gate valve 10 is composed such that the exhaust gas bypass passages 3a and 3b are closed or opened by allowing a seat face 11s of the valve body 11 to be seated against the seat face 3d of the turbine housing 1 at the opening end of the pair of the exhaust gas bypass passages 3a and 3b or to be departed from the seat face 3d by means of the lever 12 and connecting arm 13 by actuating a waste gate valve drive device not shown in the drawings.

Reference numeral 101 is the center line of the waste gate valve 10.

Exhaust gas from the engine (not shown) enters the turbine housing 1 from the twin exhaust gas entrance channels 03a, 03b, flows along the scroll passages 30a, 30b to enter the turbine rotor 2 radially to drive the turbine rotor, and flows out of the turbine through the exhaust gas outlet passage 7, 8 to an exhaust pipe not shown in the drawing.

When the exhaust turbocharger is not required to function at low speed operation of the engine and when supercharge pressure tends to be excessively high at high speed operation of the engine, the valve body 11 is opened via the lever 12 and connecting arm 13 by actuating the waste gate valve drive device not shown in the drawings. When the valve body 11 opens the bypass passages 3a and 3b, a part of exhaust gas entered from the exhaust gas entrance channels 03a, 03b is released to the exhaust outlet passage 7 passing through the exhaust gas bypass passages 3a, 3b without entering the turbine rotor 2, therefore without driving the turbine rotor 2.

The present invention relates to improvements of the waste gate valve and valve seat part of the turbine housing of an exhaust turbocharger having a waste gate valve composed as mentioned above.

The First Embodiment

Figure 1:
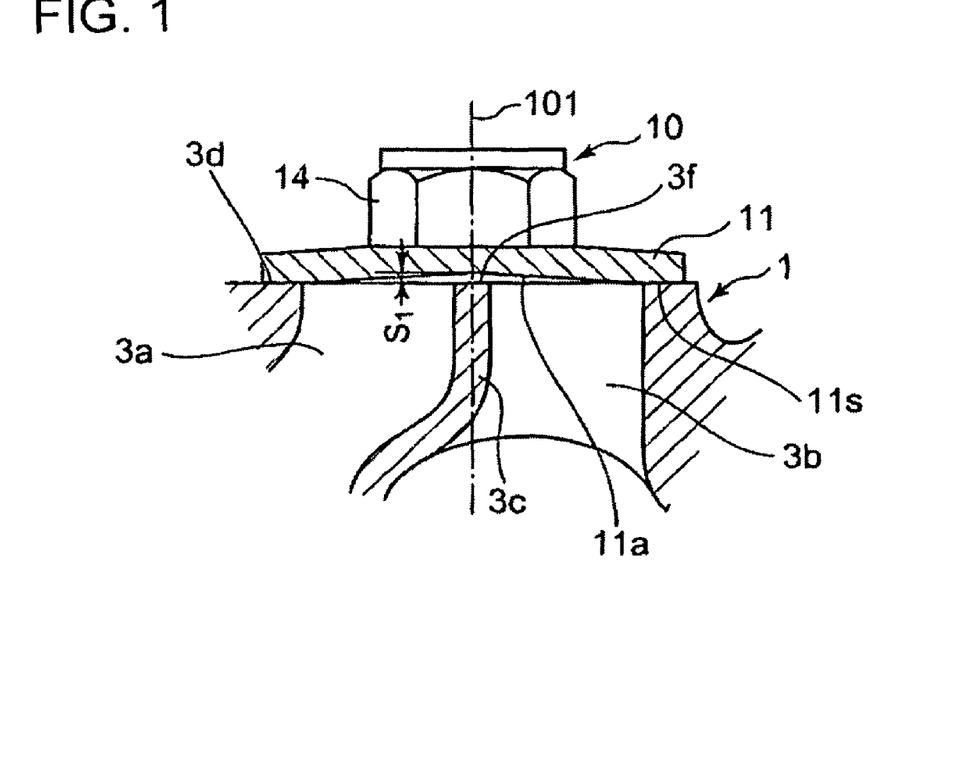
FIG. 1 is a partial cross sectional view around the waste gate valve of a first embodiment (enlarged sectional view of Z part in FIG. 6).

FIG. 1 is a partial cross sectional view around the waste gate valve of a first embodiment (enlarged sectional view of Z part in FIG. 6).

Referring to FIG. 1, a waste gate valve 10 comprises a plate-like valve body 11 for opening/closing a pair of two exhaust gas bypass passages 3a and 3b, a lever 12 (see FIG. 5) connected to the valve body 11, a nut 14 for fastening the valve body 11 to the lever 12, a connecting arm 13 (see FIG. 5). The waste gate valve 10 is composed such that the exhaust gas bypass passages 3a and 3b are closed or opened by allowing the seat face 11s of the valve body 11 at the peripheral part thereof to be seated against the seat face 3d of the turbine housing 1 at the peripheral part of the opening end of the pair of the exhaust gas bypass passages 3a and 3b or to be departed from the seat face 3d via the lever 12 and connecting arm 13.

The valve body 11 is formed such that its seat-side face of which the peripheral part serves as the seat face 11s has a conical depression 11a so that the seat-side face of the valve body 11 does not contact an end face 3f of a partition wall 3c when the waste gate valve 10 closes the exhaust gas bypass passages 3a and 3b. The conical depression has its apex on the center line 101 of the waste gate valve 10 with a gap $S_1$ between the apex and end face 3f of the partition wall 3c, and the surface of the conical depression does not contact the end face 3f of the partition wall 3c when the seat face 11s of the valve body 11 seats against the seat face 3d of the turbine housing 1 in order to close the bypass passages 3a and 3b.

The Second Embodiment

Figure 2:
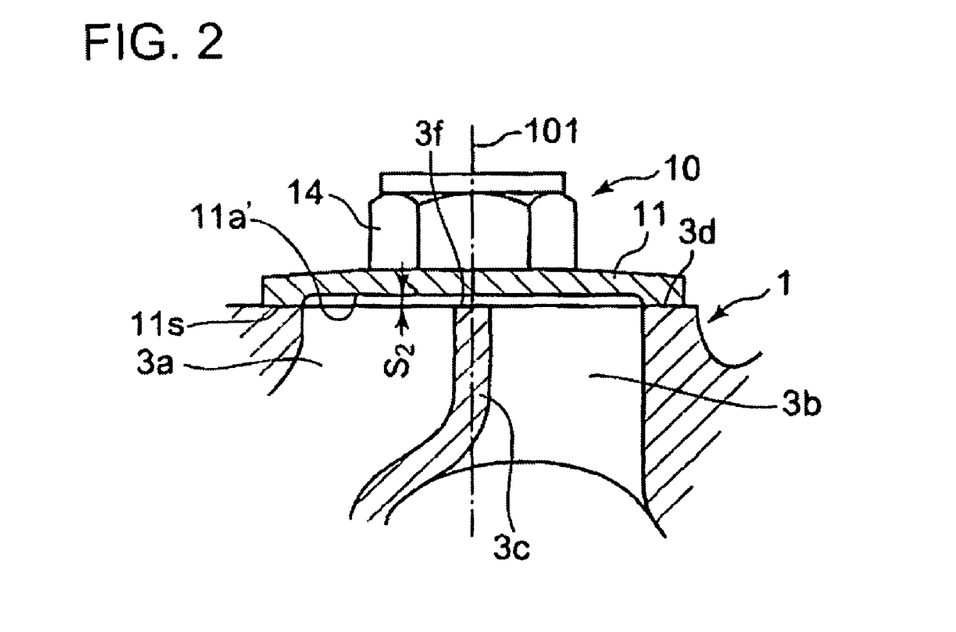
FIG. 2 is a view as in FIG. 1 of a second embodiment.

FIG. 2 is a view as in FIG. 1 of a second embodiment.

In the second embodiment, the valve body 11 is formed such that its seat-side face has an annular seat face 11s and a circular depression 11a' of a constant depth $S_2$ radially inside the annular seat face 11s. The circular depression 11a' is formed so that the seat-side face of the valve body 11 does not contact the end face 3f of the partition wall 3c when the valve body 11 seats against the seat face 3d of the turbine housing 1 to close the bypass passages 3a and 3b.

Other than that is the same as the first embodiment and the same constituent parts are denoted by the same reference numerals.

The Third Embodiment

Figure 3A:
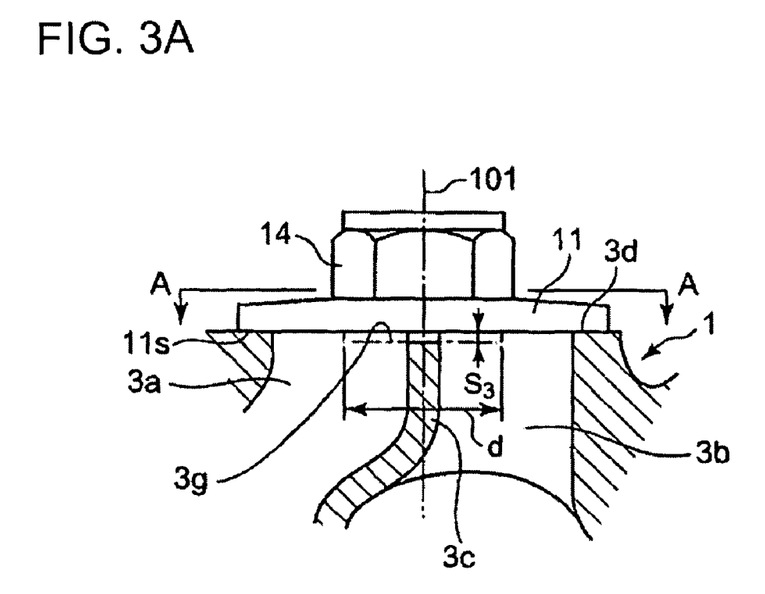
FIG. 3A is a view as in FIG. 1 of a third embodiment.
Figure 3B:
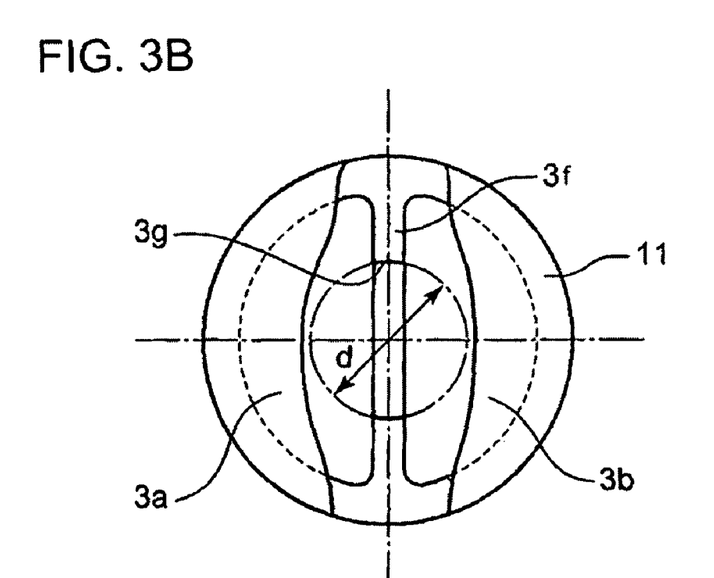
FIG. 3B is a view in the direction of arrow A-A of FIG. 3A.

FIG. 3A is a view as in FIG. 1 of a third embodiment, and FIG. 3B is a view in the direction of arrow A-A of FIG. 3A.

In the third embodiment, a depression 3g of depth $S_3$ is formed to the end face 3f the partition wall 3c. The depression 3g may be formed by milling with an end mill of diameter 'd' with its center line coinciding with the center line 101 of the waste gate valve 10. The diameter 'd' may be equal to or smaller than the diameter of a circle formed by the circumferences of semi-circles forming the openings of the two bypass passages at the outlet thereof opening into the exhaust gas outlet passage 8. Therefore, the depression 3g is an elongate depression of depth $S_3$ formed on the end face 3f of the partition wall 3c. The valve body 11 is formed such that its seat-side face is a flat surface of which the peripheral part serves as the seat face 11s of the valve body 11.

Therefore, the seat-side face of the valve body does not contact the end face 3f of the partition wall 3c in the range of the elongate depression 3g when the valve body 11 seats against the seat face 3d of the turbine housing 1 to close the bypass passages 3a and 3b.

Other than that is the same as the first embodiment and the same constituent parts are denoted by the same reference numerals.

As has been described heretofore, according to the first to third embodiments, the plate-like valve body 11 of the waste gate valve 10 is formed such that the seat-side face thereof has the conical depression 11a or constant-depth depression so that the seat-side face of the valve body 11 does not contact the end face 3f of the partition wall 3c partitioning the bypass passages 3a, 3b, or the plate-like valve body 11 is formed such that the seat-side face thereof is a flat surface and a depression 3g is formed on the end face 3f of the partition wall 3c so that the seat-side face of the valve body 11 does not contact the end face 3f of the partition wall 3c over the length or a central region of the end face 3f of the partition wall 3c when the waste gate valve 10 closes the bypass passages by allowing the seat face 11s of valve body 11 to seat against the seat face 3d of the turbine housing. Therefore, occurrence of swing of the valve body 11 with the extending line of end face 3f (which tends to be protruded from the annular seat face 3d when machining the seat face of the turbine housing 1 at the outlet of the bypass passages including the annular seat face 3d and the end face 3f of the partition wall 3) of the partition wall 3c as a fulcrum axis of swing can be prevented when the valve body 11 of the waste gate valve 10 closes the bypass passages. Accordingly, occurrence of vibration of the valve body 11 and vibration sound (chattering) when the valve body 11 closes the bypass passages as often occurs in the case of the prior art can be eliminated.

According to one of the embodiments, as the end face 3f of the partition wall 3c is depressed at least in the central region of the end face 3f, the fear is eliminated that the end face 3f, particularly central part thereof of the partition wall 3c tends to be protruded from the seat face 3d when machining the seat face 3d including the end face 3f of the partition wall 3c. Therefore, the valve body 11 can seat against the seat face of the turbine housing evenly even when the seat-side face of the valve body 11 is formed to be a flat face.

INDUSTRIAL APPLICABILITY

According to the invention, an exhaust turbocharger equipped with a waste gate valve is provided which is enhanced in durability and reliability by making the valve body of the waste gate valve to contact uniformly the seat face of the turbine housing at the opening of two exhaust gas bypass passages without affected by the end face of the partition wall partitioning the two bypass passages, thereby preventing generation of vibration and vibration sound (chattering) of the valve body of the waste gate valve and occurrence of gas leakage due to defective seating of the valve body against the seat face of the turbine housing at the opening of two exhaust gas bypass passages.

The invention claimed is:

1. An exhaust turbocharger having a twin scroll type turbine housing which has two exhaust gas entrance channels and two exhaust gas bypass passages which connect the two exhaust gas entrance channels to an exhaust outlet passage of the twin scroll type turbine housing, thereby bypassing two scroll passages, the two scroll passages for guiding exhaust gas entering the twin scroll type turbine housing from the two exhaust gas entrance channels to a turbine rotor of the exhaust turbocharger, the exhaust turbocharger comprising:
   a waste gate valve for opening/closing the two exhaust gas bypass passages, the waste gate valve having a plate-like valve body and a lever,
   wherein the plate-like valve body seats against and departs from a seat face formed at an outlet end side of the two exhaust gas bypass passages including an end face of a partition wall partitioning the two exhaust gas bypass passages,
   wherein the plate-like valve body is a disk-shaped valve,
   wherein the lever is attached at a surface of the plate-like valve body opposite to a seat-side face of the plate-like valve body, the lever for positioning the plate-like valve body to seat against and depart from the seat face of the twin scroll type turbine housing,
   wherein the seat-side face of the plate-like valve body has a conical depression such that a whole region of the end face of the partition wall does not contact the seat-side face, the conical depression having an apex at a center part thereof at which a maximum gap is formed, and
   wherein a predetermined gap is formed between the conical depression and the whole region of the end face of the partition wall such that only an outer periphery part of the plate-like valve body is seated against the seat face of the twin scroll type turbine housing when the waste gas valve closes the two exhaust gas bypass passages.

2. An exhaust turbocharger having a twin scroll type turbine housing which has two exhaust gas entrance channels and two exhaust gas bypass passages which connect the two exhaust gas entrance channels to an exhaust outlet passage of the twin scroll type turbine housing, thereby bypassing two scroll passages, the two scroll passages for guiding exhaust gas entering the twin scroll type turbine housing from the two exhaust gas entrance channels to a turbine rotor of the exhaust turbocharger, the exhaust turbocharger comprising:
   a waste gate valve for opening/closing the two exhaust gas bypass passages, the waste gate valve having a plate-like valve body and a lever,
   wherein the plate-like valve body seats against and departs from a seat face formed at an outlet end side of the two exhaust gas bypass passages including an end face of a partition wall partitioning the two exhaust gas bypass passages,
   wherein the plate-like valve body is a disk-shaped valve,
   wherein the lever is attached at a surface of the plate-like valve body opposite to a seat-side face of the plate-like valve body, the lever for positioning the plate-like valve body to seat against and depart from the seat face of the twin scroll type turbine housing,
   wherein the seat-side face of the plate-like valve body has a cylindrical depression of a constant depth such that a whole region of the end face of the partition wall does not contact the seat-side face, and
   wherein a predetermined gap is formed between the cylindrical depression and the whole region of the end face of the partition wall such that only an outer periphery part of the plate-like valve body is seated against the seat face of the twin scroll type turbine housing when the waste gas valve closes the two exhaust gas bypass passages.

3. The exhaust turbocharger according to claim 1, wherein the seat-side face is free of holes.

4. The exhaust turbocharger according to claim 2, wherein the seat-side face is free of holes.

5. The exhaust turbocharger according to claim 2, wherein the cylindrical depression of the constant depth extends across a whole area of the two exhaust gas bypass passages.

* * * * *